US012710557B2

(12) United States Patent
Wang et al.

(10) Patent No.: US 12,710,557 B2

(45) Date of Patent: Aug. 18, 2026

(54) HIGH-RESOLUTION SEISMIC FAULT DETECTION WITH ADVERSARIAL NEURAL NETWORKS AND REGULARIZATION

(71) Applicant: INSTITUTE OF GEOLOGY AND GEOPHYSICS, CHINESE ACADEMY OF SCIENCES, Beijing (CN)

(72) Inventors: Yanfei Wang, Beijing (CN); Tianqi Wang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 1025 days.

(21) Appl. No.: 17/897,736

(22) Filed: Aug. 29, 2022

(65) Prior Publication Data

US 2023/0078158 A1 Mar. 16, 2023

(30) Foreign Application Priority Data

Aug. 30, 2021 (CN) ......................... 202111001525.3

(51) Int. Cl.
*G01V 1/30* (2006.01)
*G01V 1/34* (2006.01)
(Continued)

(52) U.S. Cl.
CPC .............. *G01V 1/301* (2013.01); *G01V 1/345* (2013.01); *G01V 20/00* (2024.01); *G06N 3/088* (2013.01);
(Continued)

(58) Field of Classification Search
CPC ........ G01V 1/301; G01V 1/345; G01V 20/00; G01V 2210/612; G01V 2210/6161; G01V 2210/642; G01V 2210/74; G06N 3/088
See application file for complete search history.

(56) References Cited

U.S. PATENT DOCUMENTS 11,087,215 B1 * 8/2021 Chen ...................... G06N 3/045
11,668,684 B2 * 6/2023 Jagnnathan ............. G06N 7/01 702/39

(Continued)

FOREIGN PATENT DOCUMENTS

CN 108268870 7/2018
CN 109086773 12/2018

(Continued)

OTHER PUBLICATIONS

Imade, Kuniyasu, et al. "Loss Function of GAN to Make a Clear Judgment." 2021 Ninth International Symposium on Computing and Networking Workshops (CANDARW). IEEE, 2021. (Year: 2021).*

(Continued)

*Primary Examiner* — James T Tsai

(74) *Attorney, Agent, or Firm* — Hogan Lovells US LLP

(57) ABSTRACT

The present disclosure provides a method and a system for high-resolution seismic fault detection by means of an adversarial neural network, including following steps of: training a target adversarial neural network based on a preset training sample set, so as to obtain a trained target adversarial neural network, wherein the preset training sample set includes seismic data and fault labels, the target adversarial neural network includes: a segmentation module, a feature fusion module, and a discriminator module, the segmentation module is a module configured for obtaining a fault feature based on the preset training sample set, and the feature fusion module is a module configured for fusing the fault feature and the seismic data into a global feature map; and performing seismic fault detection on a target seismic image based on the trained target adversarial neural network.

5 Claims, 5 Drawing Sheets

S102 training a target adversarial neural network based on a preset training sample set to obtain a trained target adversarial neural network

S104 performing seismic fault detection on a target seismic image based on the trained target adversarial neural network

(51) Int. Cl.
*G01V 20/00* (2024.01)
*G06N 3/088* (2023.01)

(52) U.S. Cl.
CPC .................. *G01V 2210/612* (2013.01); *G01V 2210/6161* (2013.01); *G01V 2210/642* (2013.01); *G01V 2210/74* (2013.01)

(56) References Cited

U.S. PATENT DOCUMENTS

| | | | | |
|---|---|---|---|---|
| 2019/0302290 | A1* | 10/2019 | Alwon | G01V 1/364 |
| 2020/0134415 | A1* | 4/2020 | Haidar | G06N 3/0464 |
| 2020/0183032 | A1* | 6/2020 | Liu | G01V 1/301 |
| 2022/0035069 | A1* | 2/2022 | Cheng | G01V 20/00 |
| 2022/0208355 | A1* | 6/2022 | Li | G06N 3/09 |
| 2022/0261535 | A1* | 8/2022 | Madaan | G06F 40/166 |
| 2022/0351403 | A1* | 11/2022 | Jiang | G06T 7/70 |

FOREIGN PATENT DOCUMENTS

| | | |
|---|---|---|
| CN | 110516740 | 11/2019 |
| CN | 112711072 | 4/2021 |
| CN | 112906626 | 6/2021 |
| WO | 2021050122 | 3/2021 |

OTHER PUBLICATIONS

Wang, Tianqi, and Yanfei Wang. “High-resolution seismic faults interpretation based on adversarial neural networks with a regularization technique.” Geophysics 87.6 (2022): IM207-IM219. (Year: 2022).*

Alfarhan, Mustafa, Mohamed Deriche, and Ahmed Maalej. “Robust concurrent detection of salt domes and faults in seismic surveys using an improved UNet architecture.” IEEE access 10 (2020): 39424-39435. (Year: 2020).*

Xiong, Yu-Jie, et al. “Attention u-net with feature fusion module for robust defect detection.” Journal of Circuits, Systems and Computers 30.15 (2021): 2150272. (Year: 2021).*

First Office Action issued in CN Application No. 202111001525.3, dated Apr. 21, 2022.

Notification of Grant issued in CN Application No. 202111001525.3, dated Jul. 27, 2022.

First Office Action issued in CN Application No. 202111001525.3, date provided later in a supplemental IDS.

Notification of Grant issued in CN Application No. 202111001525.3, date provided later in a supplemental IDS.

* cited by examiner

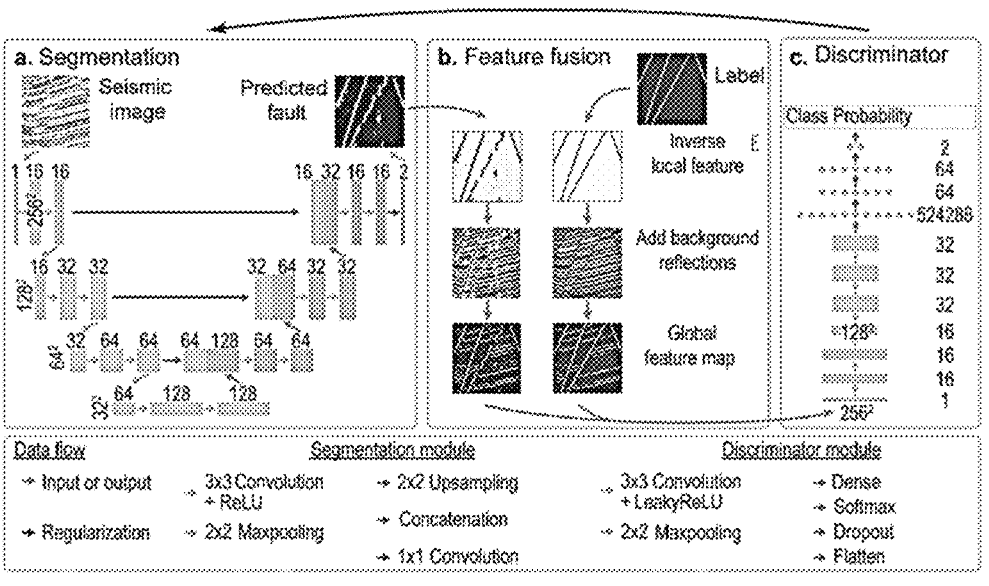
FIG. 3
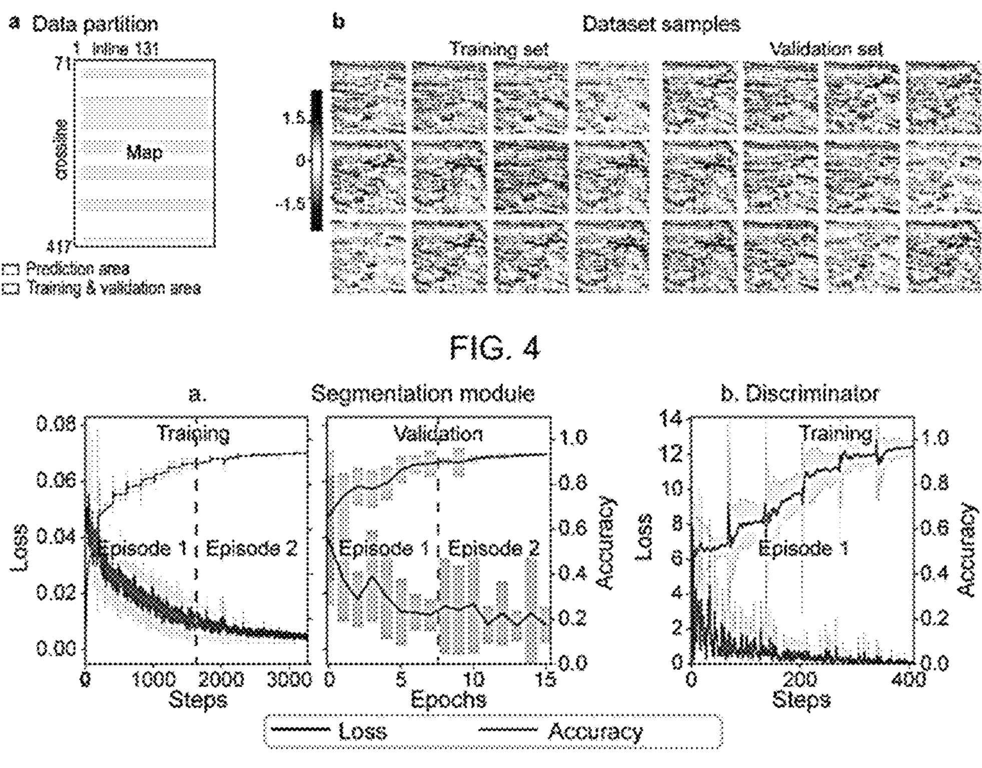
FIG. 4
FIG. 5

HIGH-RESOLUTION SEISMIC FAULT DETECTION WITH ADVERSARIAL NEURAL NETWORKS AND REGULARIZATION

CROSS-REFERENCE TO RELATED APPLICATIONS

The present application claims the priority of the Chinese Patent Application No. 202111001525.3, titled "Method and System for High-resolution Seismic Fault Detection with Adversarial Neural Network", filed with the China Patent Office on Aug. 30, 2021, the entire contents of which are incorporated herein by reference.

TECHNICAL FIELD

The present disclosure relates to the technical field of seismic fault interpretation, and particularly to a method and a system for high-resolution seismic fault detection with an adversarial neural network.

BACKGROUND ART

Fault identification methods with a neural network in previous research mainly focused on local features of a target, and the network was trained by utilizing a synthetic data set. A most commonly used fault detection method is the use of the variant of a U-Net, U-Net is a kind of neural networks applied in image pixel classification. For example, Wu et al. (2019) used a simplified U-Net network combined with large fine synthetic seismic data to realize fault detection. Similarly, Li et al. (2019) trained a U-Net network for fault detection by using a two-dimensional section from real seismic data. Although many fault segmentation results have fuzzy boundaries, U-Net networks seem to be a first choice for image segmentation problems.

In order to further highlight latent features of faults, image processing techniques are usually adopted for seismic images. Data normalization and image enhancement are commonly used methods for expanding training data and making fault features easy to be learned by neural networks. For example, a grey transformation method converts data having non-zero average amplitude into data having zero average amplitude, such that data meet the assumption of discontinuity detection (Di and Gao, 2014). In addition, data enhancement methods such as image flip and rotation or the like significantly increase the diversity of training data (Wu et al., 2019). Some other methods enhance the discontinuity of faults by reducing noises. For example, filters combining direction analysis and edge smoothing techniques can be used for removing noises and simplifying structural information (Fehmers and HO, 2003). Some regularization methods can also smooth seismic reflections and retain the discontinuity of faults (Zhao and Mukhopadhyay, 2018). However, these methods all highlight fault features by weakening background information and have relatively low accuracy and resolution of seismic fault detection.

SUMMARY

In view of this, an object of the present disclosure is to provide a method and a system for high-resolution seismic fault interpretation with an adversarial neural network, so as to alleviate technical problems of relatively low accuracy and resolution of seismic fault detection existing in the prior art.

In a first aspect, an embodiment of the present disclosure provides a method for high-resolution seismic fault detection with an adversarial neural network, comprising following steps of: training a target adversarial neural network based on a preset training sample set to obtain a trained target adversarial neural network, wherein the preset training sample set comprises seismic data and fault labels, the target adversarial neural network comprises: a segmentation module, a feature fusion module, and a discriminator module, the segmentation module is a module configured for obtaining a fault feature based on the preset training sample set, and the feature fusion module is a module configured for fusing the fault feature and the seismic data into a global feature map; and performing seismic fault detection on a target seismic image based on the trained target adversarial neural network.

Further, the step of training a target adversarial neural network based on a preset training set comprises: a first training step: training the segmentation module by utilizing the preset training sample set based on a balanced cross entropy loss function, so as to obtain a trained segmentation module; a predicting step: substituting the preset training sample set into the trained segmentation module to obtain a predicted fault feature; a fusing step: fusing the seismic data and the predicted fault feature into a global feature map based on the feature fusion module; a second training step: training the discriminator module by utilizing the global feature map based on a categorical cross entropy loss function, so as to obtain a trained discriminator module; a discriminating step: substituting the global feature map into the trained discriminator module to obtain a discriminative difference value; and an updating step: updating the balanced cross entropy loss function based on the discriminative difference value and a regularization loss function, repeating the steps from the first training step to the updating step, and finishing the training till the discriminative difference value is less than a preset threshold value.

Further, the step of fusing the seismic data and the predicted fault feature into a global feature map based on the feature fusion module comprises: performing local feature inversion on the predicted fault feature to obtain the degree of attention of the predicted fault feature; and calculating the dot product of the degree of attention and the seismic data, and performing normalization processing of local contrast, so as to obtain the global feature map.

Further, the predicted fault feature comprises a probability of predicted fault and a fault label; the step of performing local feature inversion on the predicted fault feature to obtain the degree of attention of the predicted fault feature comprises: performing local feature inversion on the predicted fault feature by following equations: $\overline{P}=1-P$, $\overline{y}=1-y$, where P is the probability of predicted fault, $\overline{P}$ is the degree of attention corresponding to the probability of predicted fault, y is the fault label, and $\overline{y}$ is the degree of attention corresponding to the fault label.

Further, the step of updating the balanced cross entropy loss function by utilizing a regularization loss function comprises: updating the balanced cross entropy loss function by following equation: $\ell_S(P, y, C)=\ell_{pixel}(P, y)+\lambda\cdot\ell_{image}(C)$; where $\lambda$ is a hyperparameter, $\ell_S(P, y, C)$ is the regularization loss function, $\ell_{pixel}(P, y)$ is the balanced cross entropy loss function, $\ell_{image}(C)$ is the discriminative difference value (implicit regularization item), and C is the output tensor of the discriminator module.

In a second aspect, an embodiment of the present disclosure further provides a system for high-resolution seismic fault detection with an adversarial neural network, comprising: a training device and a detection device; wherein the training device is configured for training a target adversarial neural network based on a preset training sample set to obtain a trained target adversarial neural network, wherein the preset training sample set comprises seismic data and fault labels, the target adversarial neural network comprises: a segmentation module, a feature fusion module, and a discriminator module, the segmentation module is a module configured for obtaining a fault feature based on the preset training sample set, and the feature fusion module is a module configured for fusing the fault feature and the seismic data into a global feature map; and the detection device is configured for performing seismic fault detection on a target seismic image based on the trained target adversarial neural network.

Further, the training device is further configured for: a first training step: training the segmentation module by utilizing the preset training sample set based on a balanced cross entropy loss function, so as to obtain a trained segmentation module; a predicting step: substituting the preset training sample set into the trained segmentation module to obtain a predicted fault feature; a fusing step: fusing the seismic data and the predicted fault feature into a global feature map based on the feature fusion module; a second training step: training the discriminator module by utilizing the global feature map based on a categorical cross entropy loss function, so as to obtain a trained discriminator module; a discriminating step: substituting the global feature map into the trained discriminator module to obtain a discriminative difference value; and an updating step: updating the balanced cross entropy loss function based on the discriminative difference value and a regularization loss function, repeating the steps from the first training step to the updating step, and finishing the training till the discriminative difference value is less than a preset threshold value.

Further, the feature fusion module is further configured for: performing local feature inversion on the predicted fault feature to obtain the degree of attention of the predicted fault feature; and calculating the dot product of the degree of attention and the seismic data, and performing normalization processing of local contrast, so as to obtain the global feature map.

In a third aspect, an embodiment of the present disclosure further provides an electronic apparatus, comprising a memory, a processor, and a computer program stored on the memory and runnable on the processor, wherein the steps of the method according to the preceding first aspect are implemented when the processor executes the computer program.

In a fourth aspect, an embodiment of the present disclosure further provides a computer-readable medium having non-volatile program code executable by a processor, wherein the program code enables the processor to execute the method according to the preceding first aspect.

The embodiments of the present disclosure provide a method and a system for high-resolution seismic fault interpretation with an adversarial neural network, wherein by adding a feature fusion module to the adversarial neural network, local fault features and global seismic data can be fused into a global feature map, which provides global information for the discriminator module used as regularization item of the neural network, hereby improving the prediction ability and the generalization ability of the adversarial neural network and alleviating the technical problems of relatively low accuracy and resolution of seismic fault detection existing in the prior art.

BRIEF DESCRIPTION OF DRAWINGS

In order to more clearly illustrate the technical solutions of the specific embodiments of the present disclosure or in the prior art, the figures required to be used in the description of the specific embodiments or the prior art will be briefly presented below. Clearly, the figures described below show certain embodiments of the present disclosure, and for a person ordinarily skilled in the art, other figures could also be obtained according to these figures without using any creative efforts.

FIG. 3 is a schematic diagram of an adversarial neural network architecture based on global feature fusion provided in an embodiment of the present disclosure;

FIG. 4 is a schematic diagram of a data schema provided in an embodiment of the present disclosure;

FIG. 5 is a schematic diagram of the average training performance of a segmentation module and a discriminator provided in an embodiment of the present disclosure;

DETAILED DESCRIPTION OF EMBODIMENTS

The technical solutions of the present disclosure will be clearly and comprehensively described below with reference to the accompanying drawings, and clearly, the described embodiments are merely some of the embodiments of the present disclosure, but not all the embodiments. All other embodiments, obtained by a person ordinarily skilled in the art without creative efforts based on the embodiments in the present disclosure, shall fall within the scope of protection of the present disclosure.

Embodiment I

Figure 1:
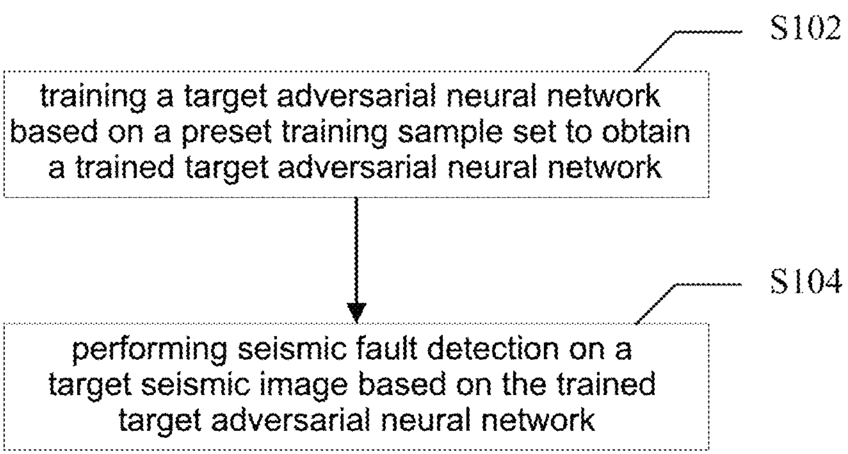
FIG. 1 is a flow chart of a method for high-resolution seismic fault detection with an adversarial neural network provided in an embodiment of the present disclosure.

FIG. 1 is a flow chart of a method for high-resolution seismic fault detection with an adversarial neural network provided according to an embodiment of the present disclosure. As shown in FIG. 1, the method specifically comprises following steps:

Step S102: training a target adversarial neural network based on a preset training sample set to obtain a trained target adversarial neural network, wherein the preset training sample set comprises seismic data and fault labels.

In the embodiment of the present disclosure, the target adversarial neural network comprises: a segmentation module, a feature fusion module, and a discriminator module; the segmentation module is a module configured for obtaining a fault feature based on the preset training sample set; optionally, the segmentation module is a U-Net type network; the feature fusion module is a module configured for fusing the fault feature and the seismic data into a global feature map; and the discriminator module is configured for identifying whether a target feature in the global feature map is from the segmentation module or a manually interpreted fault label.

Step S104: performing seismic fault detection on a target seismic image based on the trained target adversarial neural network.

The embodiment of the present disclosure provides a method for high-resolution seismic fault interpretation with an adversarial neural network, wherein by adding a feature fusion module to the adversarial neural network, local fault features and global seismic data can be fused into a global feature map, which provides global information for the discriminator module as regularization item of the neural network, hereby improving the prediction ability and the generalization ability of the adversarial neural network and alleviating the technical problems of relatively low accuracy and resolution of seismic fault detection existing in the prior art.

Figure 2:
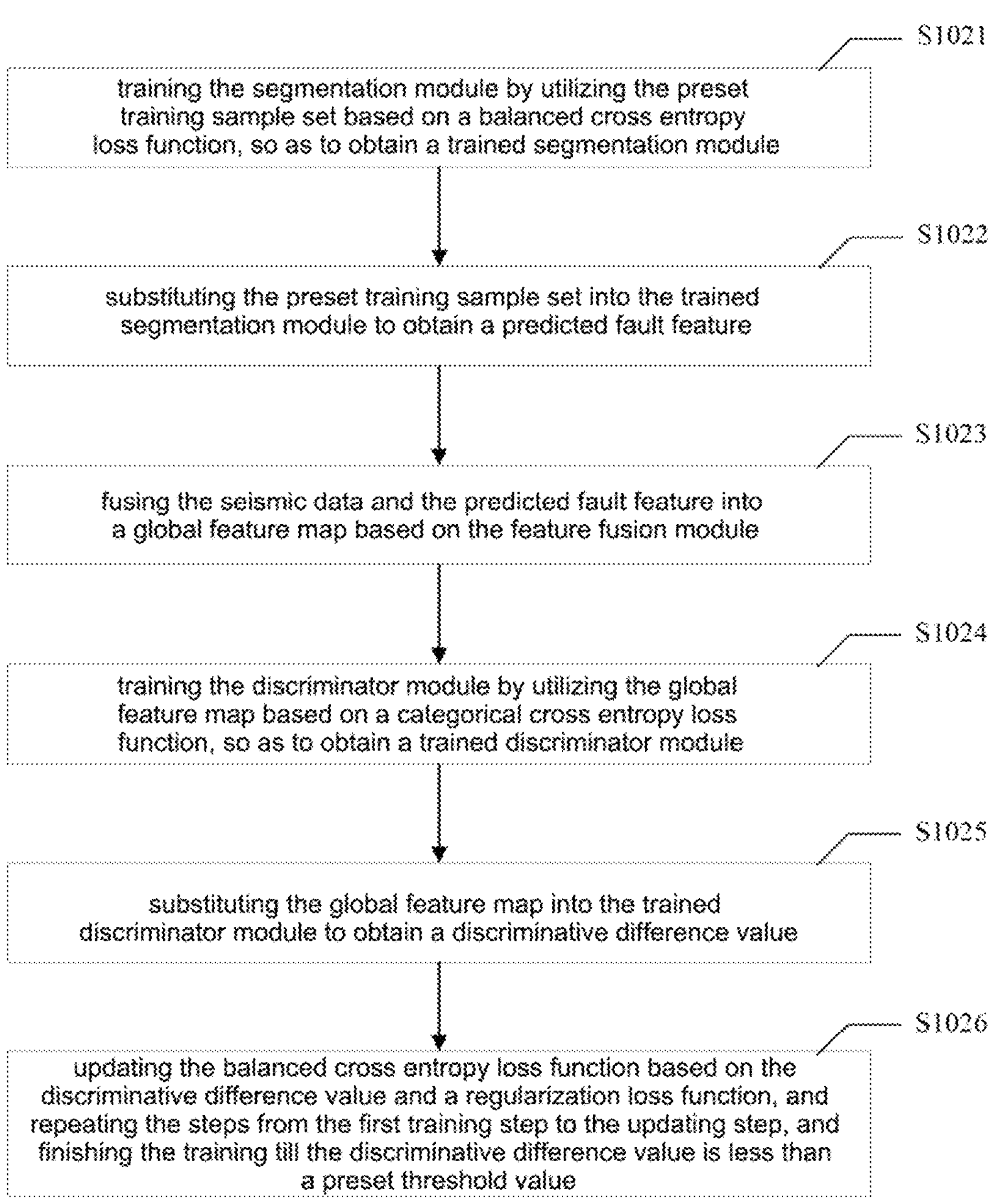
FIG. 2 is a flow chart of a method for training a target adversarial neural network provided in an embodiment of the present disclosure.

FIG. 2 is a flow chart of a method for training a target adversarial neural network provided according to an embodiment of the present disclosure. As shown in FIG. 2, in the embodiment of the present disclosure, the step of training a target adversarial neural network specifically comprises:

A first training step S1021: training the segmentation module by utilizing the preset training sample set based on a balanced cross entropy loss function, so as to obtain a trained segmentation module.

In the embodiment of the present disclosure, a cycle period includes 8 rounds of segmentation network training, and the preset training sample set and the balanced cross entropy loss function are used to automatically balance the pixel loss between a fault and a non-fault:

$$\ell_{pixel}(P, y) = -\beta_{|y_i=1} \sum_{i \in M_{|y_i=1}} \log(P_{i|y_i=1}) - \beta_{|y_i=0} \sum_{i \in M_{|y_i=0}} \log(1 - P_{i|y_i=0})$$

where M is the sum of all pixels of a seismic image inputted into the seismic data, yi is a binary label (the value at a fault is 1, and the value at a non-fault is 0); Pi is a probability of predicted fault outputted by the network ($0 \le Pi \le 1$);

$$\beta_{|y_i=1} = \frac{M_{|y_i=1}}{M}$$

is the ratio of the number of fault pixels $M_{|y_i=1}$ to the sum of all pixels M; and $\beta_{|y_i=0}=$ $$\frac{M_{|y_i=0}}{M}$$

is the ratio of the number of non-fault pixels $M_{|y_i=0}$ to the sum of all pixels M. The first item in the formula is a prediction error of the fault pixel point, and the second item is a prediction error of the non-fault pixel point.

A predicting step S1022: substituting the preset training sample set into the trained segmentation module to obtain a predicted fault feature.

In the embodiment of the present disclosure, by way of generating a predicted fault feature by utilizing the preset training samples, the segmentation module can be made lightweight (the parametric size is about 0.49 M), and only a relatively small memory space is required.

A fusing step S1023: fusing the seismic data and the predicted fault feature into a global feature map based on the feature fusion module.

Specifically, local feature inversion is firstly performed on the predicted fault feature to obtain the degree of attention of the predicted fault feature; wherein the predicted fault feature comprises a probability of predicted fault and a fault label; in the embodiment of the present disclosure, local feature inversion is performed on the predicted fault feature by following equations:

$$\overline{P}=1-P$$

$$\overline{y}=1-y$$

where P is the probability of predicted fault, $\overline{P}$ is the degree of attention corresponding to the probability of predicted fault, y is the fault label, and $\overline{y}$ is the degree of attention corresponding to the fault label. Both $\overline{P}$ and $\overline{y}$ have a value range from 0 to 1.

Then, the dot product of the degree of attention and the seismic data is calculated, and normalization processing of local contrast is performed, so as to obtain the global feature map.

Specifically, the dot product of the degree of attention and the seismic data (specifically, the seismic section) is calculated by using following equations:

$$\overline{P}_s=\overline{P}\cdot S$$

$$\overline{y}_s=\overline{y}\cdot S$$

where S is the data matrix constituting the seismic section.

In order to enhance the contrast and the edge feature, the normalization processing of local contrast is performed by using following equations:

$$\overline{P}_L = O_{LCN}(\overline{P}_s) \text{ and } \overline{y}_L = O_{LCN}(\overline{y}_s)$$

$$O_{LCN}(x) = \frac{O_{SN}(x)}{\max(O_{SD}(x).\text{mean}, O_{SD}(x))}$$

$$O_{SN}(x) = x - x * \text{Gauss}, \quad O_{SD}(x) = O_{SN}(x)^2 * \text{Gauss}$$

$$\text{Gauss} = \frac{1}{2\pi\delta^2} e^{\frac{-[(a-m)^2+(b-m)^2]}{2\delta^2}}, \ (\delta = 2)$$

where $\overline{P}_L$ and $\overline{y}_L$ are respectively the results of the normalization of local contrast corresponding to $\overline{P}_s$ and $\overline{y}_s$, and $\overline{P}_L$ and $\overline{y}_L$ are used as finally obtained global feature maps; $O_{LCN}(x)$ is an operator of the normalization of local contrast, $O_{SN}(x)$ defines the normalization by subtraction, $O_{SD}(x)$ defines the normalization by divisors, and $O_{SD}(x)$.mean is the mean value of $O_{SD}(x)$; the Gaussian filtering window has a size of 7×7, the constant m=3, (a, b) is a point coordinate, and * represents convolution operation.

In other words, the global feature map is outputted by the feature fusion module through fusion of background reflection information of the seismic image with target features of a fault, and these fault features are from the output of the segmentation module or labels of the training samples.

A second training step S1024: training the discriminator module by utilizing the global feature map based on a categorical cross entropy loss function, so as to obtain a trained discriminator module.

In the embodiment of the present disclosure, after that the segmentation module has been trained for one epoch, the initial preset training samples are transmitted to the temporarily trained segmentation module, hereby obtaining a fault prediction result (namely predicted fault feature). Then, global feature maps $\overline{P}_L$ and $\overline{y}_L$ are generated by the feature fusion module. Subsequently, $\overline{P}_L$ and $\overline{y}_L$ are inputted into the discriminator module for classification, and the discriminator will be trained for 6 rounds by using the categorical cross entropy loss function $\ell_D$:

$$\ell_D(P, z) = -\sum_{i=1}^{2N} z_{1i}\log(P_{1i}) - \sum_{i=1}^{2N} z_{2i}\log(P_{2i})$$

where 2N is the number of images of $\overline{P}_L$ and $\overline{y}_L$, $z_{1i}$ and $z_{2i}$ are the class labels of the target features, namely (1, 0) represents that the target feature is from the prediction results of the segmentation module, and (0, 1) represents that the target feature is from labels of training data; and $P_{1i}$ and $P_{2i}$ are respectively corresponding prediction probability for the above target features outputted by the discriminator. The first item of the formula is the classification error of $\overline{P}_L$, and the second item is the classification error of $\overline{y}_L$.

A discriminating step S1025: substituting the global feature map into the trained discriminator module to obtain a discriminative difference value.

Specifically, all images of $\overline{P}_L$ are inputted into the temporarily trained discriminator module, and the difference between the prediction probability ($C_1$, $C_2$) and the label (0, 1) is outputted by using:

$$\ell_{image}(C) = \frac{-\sum_{i=1}^{N} 0\cdot\log(C_{1i}) - \sum_{i=1}^{N} 1\cdot\log(C_{2i})}{N}$$

where $C=(C_1, C_2)$ is the output tensor of the discriminator, and $C_{1i}$ and $C_{2i}$ are respectively the probability that the $i^{th}$ image is from the segmentation module or the fault labels; and $\ell_{image}$ represents the deception ability of the segmentation module on the discriminator, i.e., the discriminative difference value. In other words, the greater the value of $\ell_{image}$ is, the lower the fault description accuracy of the segmentation module is, and during next training, the segmentation module would suffer penalty or update of a greater gradient. It is notable that the categorical cross entropy loss function is used in the formula when the classification category is equal to 2, which avoids the gradient vanishment caused by the application of the softmax operator.

An updating step S1026: updating the balanced cross entropy loss function based on the discriminative difference value and a regularization loss function, and repeating the steps from the first training step to the updating step, and finishing the training till the discriminative difference value is less than a preset threshold value.

Specifically, the balanced cross entropy loss function is updated by following equation:

$$\ell_S(P,y,C) = \ell_{pixel}(P,y) + \lambda\cdot\ell_{image}(C)$$

where $\lambda$ is a hyperparameter, $\ell_S(P, y, C)$ is the regularization loss function, $\ell_{pixel}(P, y)$ is the balanced cross entropy loss function, $\ell_{image}(C)$ is the discriminative difference value (implicit regularization item), and C is the output tensor of the discriminator module.

During the adversarial training process according to the embodiment of the present disclosure, in order to balance the losses of the segmentation module and the discriminator module, the value range of $\lambda$ is set to (0.15, 0.3), and when $\lambda=0.2$, a very good result is obtained in the present disclosure, and the performance of the segmentation module after the adversarial training is significantly improved.

FIG. 3 is a schematic diagram of an adversarial neural network architecture (FaultAdvNet) based on global feature fusion provided according to an embodiment of the present disclosure. As shown in FIG. 3, the network architecture of FaultAdvNet is composed of: (a) a segmentation module, (b) a feature fusion module, and (c) a discriminator module. Color lumps in (a) and (b) are feature mappings marked by size and number of convolution kernels. Dots in (c) represent neurons in a fully-connected layer, and the classification result is finally outputted.

Specifically, as shown in FIG. 3, the segmentation module is a U-Net type network, wherein an input having a size of 256×256 is compressed by a convolutional layer through downsampling to 32×32, and then the latent feature vector (32×32) is expanded through upsampling to the same size as the feature mapping of the same level in the downsampling path (as shown in a in FIG. 3). The feature mapping in the compression path is stepwise connected to an expansion path (copy and cut), so as to eliminate the gradient vanishment during the training process. The convolution kernels in the compression path and in the expansion path have a size of 3×3, and the numbers of the convolution kernels at different levels are respectively 1, 2, 16, 32, 64, and 128 (as shown by the color lumps in a in FIG. 3). Correspondingly, the kernel sizes of the downsampling and the upsampling are both 2×2. There are 487009 trainable parameters in the segmentation module, indicating that a relatively small memory space is required in the network in the embodiment of the present disclosure.

As shown in c in FIG. 3, the network input of the discriminator module is a global feature map having a size of 256×256, and undergoes 4 convolutional layers and 2 max-pooling layers. Then, the latent feature vector is flattened and inputted into a classifier consisting of 4 fully-connected layers. The classifier generates a class probability tensor, and the probability value represents whether a target feature in the global feature map (as shown in b in FIG. 3) is from the segmentation module or a manually interpreted fault label. Finally, the discriminator module functions as a generalized regularization item to improve the performance of the segmentation module. There are 33.57 million trainable parameters in the discriminator module, and in the embodiment of the present disclosure, its functional capacity is large enough.

In order to validate the effectiveness of the method for high-resolution seismic fault detection with an adversarial neural network provided in the embodiment of the present disclosure, the data set provided in the embodiment of the present disclosure is a subset of the three-dimensional seismic data volume collected from the Gulf of Mexico. The data volume is composed of 131 longitudinal survey lines and 174 transverse survey lines, and the distances of the longitudinal survey lines and the transverse survey lines are respectively 50 m and 25 m. There are 376 sampling sites in each recording channel, the delay recording time is 1000 ms, and the sampling rate is 4 ms. Since faults and horizons are usually interpreted in discrete regions, the data volume is divided into training data and prediction (test) data in the embodiment of the present disclosure, in a manner similar to that shown in a in FIG. 4, wherein FIG. 4 is a schematic diagram of a data schema provided according to an embodiment of the present disclosure. Specifically, there are 83 transverse survey lines for training (68 lines are used as training set, and 15 lines are used as validation set) and 91 transverse survey lines for prediction. Then, the training data are subjected to systematic processing, so as to enhance the data features and expand the data bulk, including elastic transformation, changing of intensity of illumination, addition of Gaussian noise, Gaussian blur, image rotation or the like, and finally subjected to data standardization. After data pre-processing, the training set and the validation set are respectively expanded to 204 and 43 transverse survey lines (as shown in b in FIG. 1).

Then, the segmentation module and the discriminator are successively trained based on the above data set and the adversarial neural network architecture, and the average training performance is evaluated, as shown in FIG. 5, and FIG. 5 is a schematic diagram of the average training performance of a segmentation module and a discriminator provided in an embodiment of the present disclosure. During a first epoch of training, the weighing (trainable parameters) of the segmentation module was updated for 8 rounds (1632 steps). As a result, the training accuracy of the segmentation module was increased to 89%, while the training loss was reduced to 0.19 (as shown in a in FIG. 5). The precision rate and the loss of corresponding validation set were respectively increased to 90% and reduced to 0.26. Then, the discriminator was trained for 6 rounds (408 steps, as shown in b in FIG. 5), and the training accuracy and the loss of the discriminator were respectively increased to 97% and reduced to 0.005. Subsequently, the discriminator returned the loss (i.e., the regularization loss function) to the segmentation module for a second training epoch. As shown in a in FIG. 5, the training of the segmentation module converged at the end of the second epoch of training, and the precision rates of the training set and the validation set were respectively 94% and 93.5%, while the losses were stably kept at 0.12 and 0.17. In summary, the variance of the precision rate was reduced from ~0.048 of the first epoch to ~0.007 of the second epoch, the variance of the loss was reduced from ~0.189 of the first epoch to ~0.061 of the second epoch, and the variances during the training process indicate the training convergence of the segmentation module and the discriminator.

Figure 6:
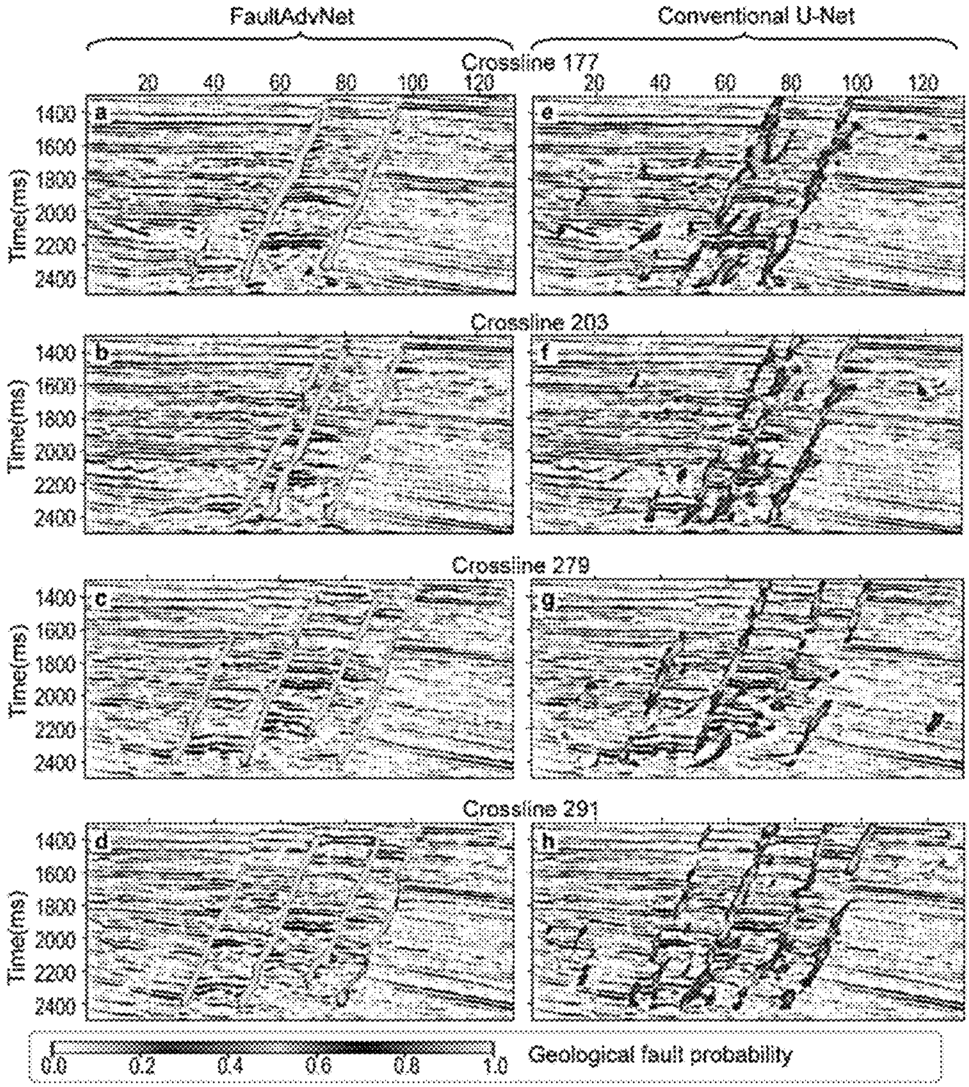
FIG. 6 is a schematic diagram showing fault identification on the real seismic data in the Gulf of Mexico by utilizing a trained target adversarial neural network provided in an embodiment of the present disclosure.

FIG. 6 is a schematic diagram showing fault identification on the real seismic data in the Gulf of Mexico by utilizing a trained target adversarial neural network provided in an embodiment of the present disclosure. In the above, the subgraphs in the left column in FIG. 6 (from a to d) show prediction results of the method provided in the embodiment of the present disclosure, and the subgraphs in the right column (from e to h) show prediction results of a U-Net network in the prior art. Specifically, in the embodiment of the present disclosure, four transverse survey lines in the prediction region in a in FIG. 4 are selected for seismic section interpretation, as shown in the left column in FIG. 6, the fault probability value predicted by FaultAdvNet provided in the embodiment of the present disclosure is mainly concentrated at 0.9~1, and the predicted fault has good continuity, has sharp fault boundary and definite fault dip angle. In the embodiment of the present disclosure, fault prediction results of the traditional U-Net network in the prior art are further exhibited in the right column in FIG. 6. In comparison, the fault probability values predicted by the traditional U-Net network are scattered from 0.1 to 0.55, which is only slightly greater than a random threshold value 0.5. In addition, the fault predicted by the traditional U-Net network has a fuzzy boundary, and the reflection signal of the sedimentary formation could be misjudged. In summary, the prediction of FaultAdvNet provided in the embodiment of the present disclosure has high reliability, while the traditional U-Net shows high uncertainty.

Figures 7, 8:
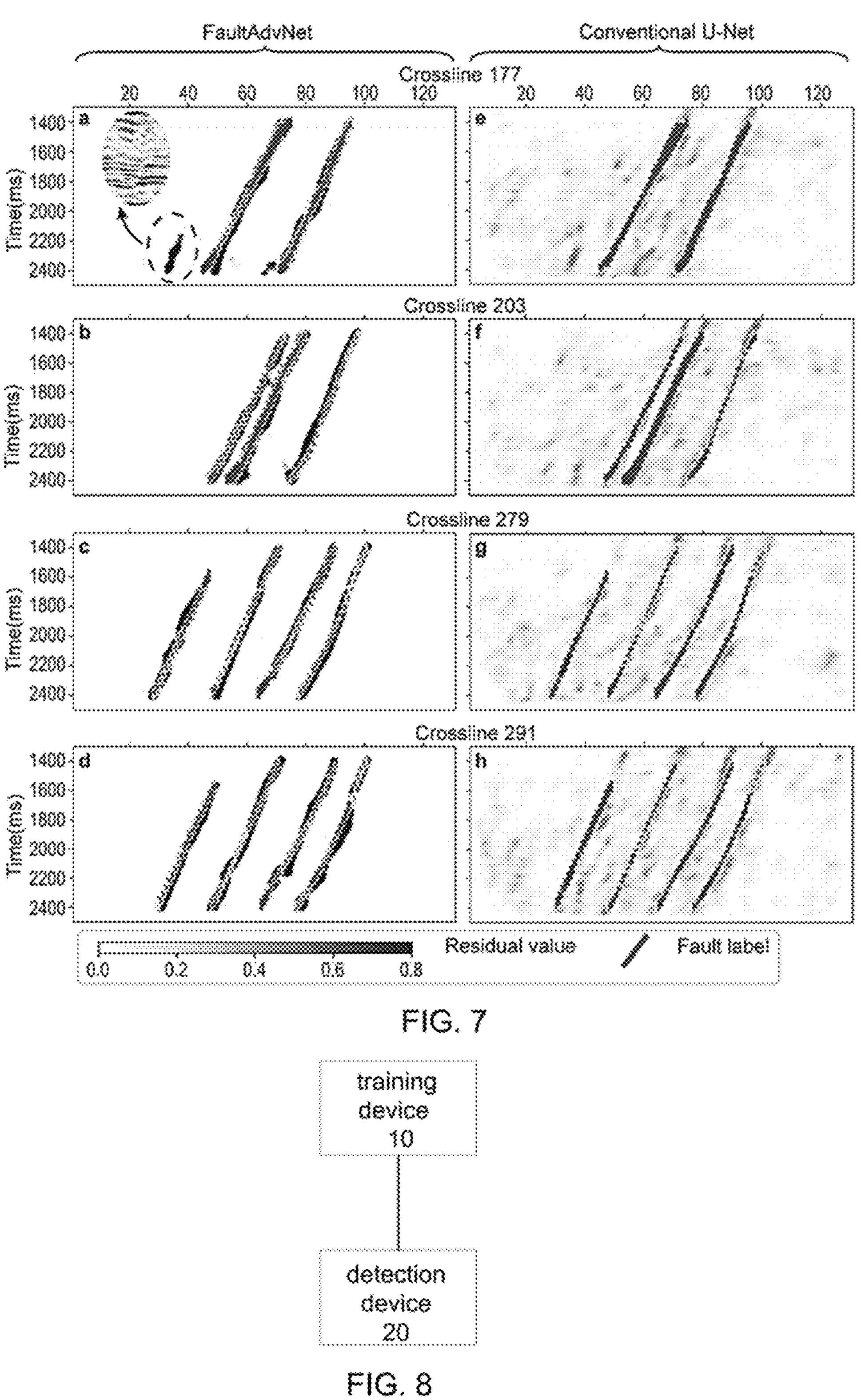
FIG. 7 is a schematic diagram of difference visualization between a fault label and a network prediction provided in an embodiment of the present disclosure.
FIG. 8 is a schematic diagram of a system for high-resolution seismic fault detection with an adversarial neural network provided in an embodiment of the present disclosure.

FIG. 7 is a schematic diagram of difference visualization between a fault label and a network prediction provided in an embodiment of the present disclosure. In the above, fault labels and the difference between the prediction and the labels are depicted in the same image. As shown by the fault labels, the FaultAdvNet network accurately picked up all the faults, which have sharp boundaries and precise dip angles, with the exception of one feature marked by a circle in a in FIG. 7. However, corresponding seismic image (as shown in a in FIG. 6) confirms that it is a discontinuous reflection, and it may be a small geological fault, but not labeled by the labels in the prediction data. In comparison, a fault cannot be positioned through the prediction with the traditional U-Net network, because the fault prediction results are all over the seismic section and are entangled with adjacent faults (e to h in FIG. 7).

Differing from most traditional U-Net networks only focusing on target local features, the adversarial neural network, namely FaultAdvNet, based on global feature fusion applied in the detection method provided in the embodiment of the present disclosure achieves better performance by considering the entire geological reflection information. Specifically, FaultAdvNet provided in the embodiment of the present disclosure improves the identification performance in two aspects: (1) global features are enhanced by fusing local fault features with reflection features of surrounding sediments; and (2) adversarial training and a discriminator module are added, and its functional capacity is about 70 times that of the segmentation module.

In geophysical imaging, the reflection of a target geological construct body and the reflection of ubiquitous sediments are usually corelated with each other, especially under circumstances of heterogeneous and discontinuous strata. Thus, combining target features with background features in actual seismic data is a key to improve the prediction ability and the generalization ability of the neural network. The feature fusion method provided in the embodiment of the present disclosure highlights the relationship between key geological features and necessary background information during the training process. The discriminator is trained by utilizing a global feature map, such that it has strong identification ability and is able to precisely distinguish between geological faults and surrounding sediments. Even more important, the discriminator returns a mismatch loss to the segmentation module according to the prediction results, and further improvement of the segmentation module is effectively guided. Accordingly, a lightweight segmentation module is enabled to segment geological faults having sharp boundaries by utilizing real seismic data, without considering background noises.

For example, after the first epoch of training in a manner similar to that of the traditional U-Net networks, the output of FaultAdvNet provided in the embodiment of the present disclosure only identifies fuzzy regions surrounding the fault as prediction result. However, after the second epoch of training, well trained FaultAdvNet could accurately pick up faults with very high resolution. In comparison, a trained typical U-Net network can only produce an output of a low reliability (~0.56), wherein some predictions are substantially parallel to the inclined direction of the fault label in the image. Although certain post-processing can be performed on the prediction results of the network to help to position faults, it is still difficult to separate two adjacent faults close in distance only by using the fuzzy output of the traditional U-Net network.

It can be determined from the above description that the embodiment of the present disclosure provides a method for high-resolution seismic fault detection with an adversarial neural network, and real seismic data can be utilized to perform high-resolution (dozens of meters) fault detection. The research having the actual seismic documents of the Gulf of Mexico as an example shows that compared with the traditional U-Net network, the prediction performance and the generalization performance of the segmentation module are significantly improved through the feature fusion method and the adversarial training method provided in the embodiment of the present disclosure. The feature fusion method provides global information for the discriminator module as regularization item of the neural network by synthesizing target features and background features. Experimental results show that the discriminator module effectively constrains the segmentation network, such that target boundaries can be precisely marked in the fault segmentation task. Just because of the strong constraining function of the discriminator module, FaultAdvNet can be well trained with only a small amount of actual seismic documents.

The method provided in the embodiment of the present disclosure provides a prospect for low-cost high-resolution geological fault exploration by utilizing a small amount of actual seismic documents. In addition, the idea of fusing a global feature map with a neural network as implicit regularization item also has a broad application prospect in other geological feature identification tasks of seismic documents, such as seismic traces, salt domes, gas chimneys or the like.

Embodiment II

FIG. 8 is a schematic diagram of a system for high-resolution seismic fault detection with an adversarial neural network provided according to an embodiment of the present disclosure. As shown in FIG. 8, this system comprises: a training device 10 and a detection device 20.

Specifically, the training device 10 is configured for training a target adversarial neural network based on a preset training sample set to obtain a trained target adversarial neural network, wherein the preset training sample set comprises seismic data and fault labels, the target adversarial neural network comprises: a segmentation module, a feature fusion module, and a discriminator module, the segmentation module is a module configured for obtaining a fault feature based on the preset training sample set, and the feature fusion module is a module configured for fusing the fault feature and the seismic data into a global feature map.

The detection device 20 is configured for performing seismic fault detection on a target seismic image based on the trained target adversarial neural network.

The embodiment of the present disclosure provides a system for high-resolution seismic fault interpretation with an adversarial neural network, wherein by adding a feature fusion module to the adversarial neural network, local fault features and global seismic data can be fused into a global feature map, which provides global information for the discriminator module as regularization item of the neural network, hereby improving the prediction ability and the generalization ability of the adversarial neural network and alleviating the technical problems of relatively low accuracy and resolution of seismic fault detection existing in the prior art.

Specifically, the training device 10 is further configured for:

a first training step: training the segmentation module by utilizing the preset training sample set based on a balanced cross entropy loss function, so as to obtain a trained segmentation module;

a predicting step: substituting the preset training sample set into the trained segmentation module to obtain a predicted fault feature;

a fusing step: fusing the seismic data and the predicted fault feature into a global feature map based on the feature fusion module;

a second training step: training the discriminator module by utilizing the global feature map based on a categorical cross entropy loss function, so as to obtain a trained discriminator module;

a discriminating step: substituting the global feature map into the trained discriminator module to obtain a discriminative difference value; and an updating step: updating the balanced cross entropy loss function based on the discriminative difference value and a regularization loss function, repeating the steps from the first training step to the updating step, and finishing the training till the discriminative difference value is less than a preset threshold value.

Optionally, the feature fusion module provided in the embodiment of the present disclosure is further configured for:

performing local feature inversion on the predicted fault feature to obtain the degree of attention of the predicted fault feature; and calculating the dot product of the degree of attention and the seismic data, and performing normalization processing of local contrast, so as to obtain the global feature map.

An embodiment of the present disclosure further provides an electronic apparatus, comprising a memory, a processor, and a computer program stored on the memory and runnable on the processor, wherein the steps of the method in the preceding embodiment I are implemented, when the processor executes the computer program.

An embodiment of the present disclosure further provides a computer-readable medium having non-volatile program code executable by a processor, wherein the program code enables the processor to execute the method in the preceding embodiment I.

At last, it shall be clarified that the above respective embodiments are merely used to illustrate the technical solutions of the present disclosure, rather than limiting the same; although the present disclosure is illustrated in detail referring to the preceding respective embodiments, it should be understood for a person ordinarily skilled in the art that modifications could still be made to the technical solutions recorded in the preceding respective embodiments, or partial or all technical features therein could be substituted with equivalents; and these modifications or substitutions do not make the essence of the respective technical solutions depart from the scope of the technical solutions of the respective embodiments of the present disclosure.

The invention claimed is:

1. A method for high-resolution seismic fault detection with an adversarial neural network, wherein the method comprises following steps of:

training a target adversarial neural network based on a preset training sample set to obtain a trained target adversarial neural network, wherein the preset training sample set comprises seismic data and fault labels, the target adversarial neural network comprises: a segmentation module, a feature fusion module, and a discriminator module, the segmentation module is a module configured for obtaining a fault feature based on the preset training sample set, and the feature fusion module is a module configured for fusing the fault feature and the seismic data into a global feature map; and performing seismic fault detection on a target seismic image based on the trained target adversarial neural network;

wherein the step of training a target adversarial neural network based on a preset training set comprises:

a first training step A: training the segmentation module by utilizing the preset training sample set based on a balanced cross entropy loss function, so as to obtain a trained segmentation module;

a predicting step B: substituting the preset training sample set into the trained segmentation module to obtain a predicted fault feature;

a fusing step C: fusing the seismic data and the predicted fault feature into a global feature map based on the feature fusion module;

a second training step D: training the discriminator module by utilizing the global feature map based on a categorical cross entropy loss function, so as to obtain a trained discriminator module;

a discriminating step E: substituting the global feature map into the trained discriminator module to obtain a discriminative difference value; and an updating step F: updating the balanced cross entropy loss function based on the discriminative difference value and a regularization loss function, and repeating the steps A through F from the first training step to the updating step, and finishing the training if the discriminative difference value is less than a preset threshold value; and wherein the step of fusing the seismic data and the predicted fault feature into a global feature map based on the feature fusion module comprises:

performing local feature inversion on the predicted fault feature to obtain a degree of attention of the predicted fault feature; and calculating the dot product of the degree of attention and the seismic data, and performing normalization processing of local contrast, so as to obtain the global feature map.

2. The method according to claim 1, wherein the predicted fault feature comprises a probability of predicted fault and a fault label; the step of performing local feature inversion on the predicted fault feature to obtain the degree of attention of the predicted fault feature comprises:

performing local feature inversion on the predicted fault feature by following equations:

$$\overline{P}=1-P$$

$$\overline{y}=1-y$$

where P is the probability of predicted fault, $\overline{P}$ is the degree of attention corresponding to the probability of predicted fault, y is the fault label, and $\overline{y}$ is the degree of attention corresponding to the fault label.

3. The method according to claim 2, wherein the step of updating the balanced cross entropy loss function by utilizing a regularization loss function comprises:

updating the balanced cross entropy loss function by following equation:

$$1\_S(P,y,C)=1\_\mathrm{pixel}(P,y)+2\cdot 1\_\mathrm{image}(C)$$

where λ is a hyperparameter, 1 S (P,y,C) is the regularization loss function, 1 pixel (P,y) is the balanced cross entropy loss function, 1 image (C) is the discriminative difference value, and C is the output tensor of the discriminator module.

4. A system for high-resolution seismic fault detection with an adversarial neural network, wherein the system comprises: a training device and a detection device; wherein the training device is configured for training a target adversarial neural network based on a preset training sample set to obtain a trained target adversarial neural network, wherein the preset training sample set comprises seismic data and fault labels, the target adversarial neural network comprises: a segmentation module, a feature fusion module, and a discriminator module, the segmentation module is a module configured for obtaining a fault feature based on the preset training sample set, and the feature fusion module is a module configured for fusing the fault feature and the seismic data into a global feature map; and the detection device is configured for performing seismic fault detection on a target seismic image based on the trained target adversarial neural network;

wherein the training device is further configured for:

a first training step A: training the segmentation module by utilizing the preset training sample set based on a balanced cross entropy loss function, so as to obtain a trained segmentation module;

a predicting step B: substituting the preset training sample set into the trained segmentation module to obtain a predicted fault feature;

a fusing step C: fusing the seismic data and the predicted fault feature into a global feature map based on the feature fusion module;

a second training step D: training the discriminator module by utilizing the global feature map based on a categorical cross entropy loss function, so as to obtain a trained discriminator module;

a discriminating step E: substituting the global feature map into the trained discriminator module to obtain a discriminative difference value; and an updating step E: updating the balanced cross entropy loss function based on the discriminative difference value and a regularization loss function, and repeating the steps A through F from the first training step to the updating step, and finishing the training if the discriminative difference value is less than a preset threshold value; and wherein the feature fusion module is further configured for:

performing local feature inversion on the predicted fault feature to obtain a degree of attention of the predicted fault feature; and calculating the dot product of the degree of attention and the seismic data, and performing normalization processing of local contrast, so as to obtain the global feature map.

5. An electronic apparatus, comprising a memory, a processor, and a computer program stored on the memory and runnable on the processor, wherein the steps of the method according to claim 1 are implemented when the computer program is executed by the processor.

* * * * *